Patented Oct. 21, 1952

2,614,948

UNITED STATES PATENT OFFICE 2,614,948

PRODUCING MODIFIED MACHINE ELEMENTS

Michael W. Freeman, Detroit, Mich.

No Drawing. Application March 27, 1947, Serial No. 737,735

2 Claims. (Cl. 148—6.17)

This invention relates to the treatment of machine elements in its broadest sense and meaning, to produce modified surfaces thereon which resist scuffing, scoring, and seizing of such machine elements when operating under conditions of extremely high pressures and temperatures.

Machine elements using the term in a generic sense, under service conditions are subject to deterioration in one or more of many directions including scuffing, scoring, seizing. Thus in development in structure and design of modern engines and machines, such increased power and speed has resulted that previously suitable extreme pressure lubricants designed to lubricate and prevent damage to movable machine parts are frequently entirely useless for lubrication of modern machines, especially during the breaking-in period. Thus due to the inability of lubricating materials to withstand extreme pressures and/or severe conditions developed in the engine or machine during operation, hypoid gears, pistons, piston rings, cylinder walls, camshafts, as well as other essential parts of the engine are severely damaged or fail completely. Similar considerations apply to moving parts in other combinations and especially where free lubrication is contraindicated, as for example, in connection with hinges, particularly for automobile doors, shock absorbers, pistons, piston rod guides, aluminum pistons and piston rings, piston rods, etc.

Among the objects of the present invention is the treatment of machine elements to modify their surface characteristics so that damage due to scoring, scuffing, seizure, etc. is avoided during the breaking-in period or subsequent period of use.

Other objects include the treatment of such machine elements to produce a tenacious integral chemical film or coating on the frictional surface which will not rupture under even the most severe operating conditions.

Other objects include the production of such surface modification by treatment of the machine elements with phosphorus sulfides or their derivatives or organic sulfonic compounds or their derivatives, or combinations of such materials to produce the results set forth.

Further objects include the production of modified machine elements that may more efficaciously be used in or under operating conditions with improved results when lubricated by any suitable lubricant having extreme pressure characteristics so that the machine elements will not score, scuff or seize even under the most severe conditions.

Still further objects and advantages of the present invention will appear from the more detailed description set forth below, it being understood that such more detailed description is given by way of illustration and explanation only, and not by way of limitation, since various changes therein may be made by those skilled in the art without departing from the scope and spirit of the present invention.

In accordance with the present invention, machine elements particularly those which operate under conditions where there is frictional contact of surfaces of such elements are modified in order to protect them from deterioration or development of defects under service conditions, particularly of severe character, as for example, to prevent scuffing, scoring and seizure. The term machine elements is used in a broad sense to cover all kinds and manner of such elements which are used under operating conditions where frictional forces come into play and include for example, gears, pistons, piston rings, cylinder walls, camshafts, engine parts generally, hinges, shock absorber parts, shafts, pinions, pump parts, bearings, journals, dies for drawing and stamping, etc. Such elements are principally of ferrous or ferrous alloy type but various features of the invention are applicable to other metals and metallic alloys besides irons and steels including copper, bronze, aluminum, etc. As exemplary of the effects obtained in treatment of ferrous elements, ferrous alloys will be utilized to illustrate the invention below.

In accordance with the present invention, it is believed that the surface of the metal is altered chemically and that there is formed thereon an integral thin protective lubricating film. It is further believed that there is alteration in the chemical composition of the metal surface leading to the formation of complex surface coatings or metal modified at the surface which modified surfaces possess anti-welding and anti-frictional properties. But in referring to surface modification in this way whether chemical or physical or a combination of such effects, no limitation on the invention is intended by any theoretical considerations, since the observed effects have been obtained regardless of the explanation offered to explain those results.

The treatment is carried out by the use of a phosphorus sulfide compound either inorganic or organic or of an organic sulfonic derivative or combinations of such stated materials may be employed. They are utilized generally in a treating medium which carries the treating agent or combinations of treating agents. It is believed that there is formed on the metal surface a complex phosphosulfide and/or sulfo-phosphosulfide coating or a sulfonate film or a combination of such coatings and films depending on the materials employed in the treatment. Such treated metals have the desired characteristics explained above of resisting deterioration or production of defects under service conditions of even the most severe character.

Ordinarily the treating material or agent will be dissolved or suspended or dispersed in an inert medium of liquid character but where the treating agent is itself liquid or liquefiable under the conditions employed in the treatment of metal therewith, it may be used by itself without any addition of inert medium. Or the treating agent may be dissolved in or dispersed in liquid treating agents produced in accordance with the present invention, the latter serving not only as a treating medium but also as a medium for carrying the first mentioned treating agent.

The medium in which the treating agent or combinations of treating agents is employed will necessarily vary when utilized depending on the nature of the treating agent or combination treating agent employed, the conditions under which it is utilized, and the metal being subjected to treatment. It should be kept in mind and emphasized that the present invention is concerned with the treatment of machine elements in their final fabricated form in condition for use without further metal working such as rolling, drawing, stamping, etc. It is the final fabricated element which is utilized in accordance with the present invention and which is subjected to the treatment to give it the properties set forth above so that such fabricated machine element is ready for use directly after the treatment without further metal working of any character. While, of course, such machine elements may after the treatment be subjected to a simple operation such as cleaning, even this is generally not necessary unless there are materials in the treating agent which should be removed to prevent further action on the metal of the machine element or for any functional or non-functional reason. Consequently the medium employed for the treating agent must be chosen with these considerations in mind but generally such treating medium besides being one of the liquid treating agents as set forth above may be chosen from water or other aqueous media either alone or treated to incorporate rust-proofing, non-freezing, or active ingredients such as acids, bases, etc., lipoid materials including the animal lipoids such as fats, fatty acids, etc., and the vegetable lipoids including the vegetable fats, vegetable fatty acids, etc., or combinations of them, or the vegetable, animal, and mineral oils and their various fractions and distillates or combinations of any of these stated lipoids and mineral oil fractions, as well as organic fluids in general, both functional and non-functional, such as (a) organic or inorganic bases acting as solvents for phosphorus-sulfide, or to absorb gases formed, such as sulfur dioxide, hydrogen sulfide, etc., triethanol amine being exemplary, and (b) organic fluids including aliphatic, ali- cyclic, carbocyclic, and heterocyclic groups, such as tricresyl phosphate, trichloroethylene, dichloro-diphenyloxide, glycerine, ethylene glycol, alcohols, etc., or (c) any combinations of any of these stated media many of which will be illustrated below.

The machine elements may be treated in any desired way with the treating agent with or without suspending or carrying medium as explained above. The conditions for treatment depend again on the nature of the treating composition, the metal being treated, and the degree of surface modification which is sought. The treatment may be carried out at ordinary room temperatures, i. e., without any heat being supplied by immersion of the machine element in the desired treating agent or medium carrying such treating agent and after the treatment has been carried out to the degree desired which may vary from a few hours to a day or more, removing the treated machine element from the treating bath and subsequently if desired removing excess treating agent or bath from the element and drying it. These operations are not necessarily indicated depending on the conditions under which the operation is carried out and the treating medium itself.

The treating agent may be employed under such conditions as to produce the surface reaction in situ. Thus treating agents of the character set forth above may be utilized in a lubricating oil or in other selected media as an additive thereto, the lubricating oil or other medium generally being the major amount of such composition and the additive being present in minor amount and the machine element subjected to treatment with such medium carrying treating additive. This may be done in a separate treatment zone or may be carried out in situ where the medium carrying the additive is utilized as a crank case oil, transmission oil, rear axle oil, shock absorber medium, hydraulic fluid, etc. Any reaction which takes place under such conditions is usually of a slow and protracted character as compared with the operations which take place under heat treatment where higher temperatures and concentrations are employed. However, after the wearing surface treatment in situ has been accomplished, the medium may be replaced with one which does not need to contain the additive to maintain its function.

These treatments in the present case should be distinguished from the prior art use of extreme pressure lubricants containing additives. Such conventional prior art extreme pressure lubricants are utilized to withstand pressures as "molecular ball bearings." And the extreme pressure lubricant composition must be retained and used as such. In the present invention, on the other hand, there is accomplished a surface phenomena, a definite directed surface physicochemical change that is an integral part of the machine or other element treated and is self-sufficient, i. e., it can function at extreme pressures in a medium ordinarily not capable of sustaining such service. The effective film thus produced on the part in accordance with the present invention can be effected by heat and proper concentration of the active compound in a relatively short time, or a similar surface reaction may be effected gradually over a longer period of time without external heat after which the metal surface is self-sufficient in extreme pressure service. Also it may be noted that because of their properties, the active compounds of the present case may be used as additives per se in lubricants, hydrocarbon and otherwise. The surface phenomena which come into play as a result of the present invention are not theoretical, a result demonstrated by the fact that the machine or other element is capable, as pointed out above, of functioning under extreme pressure conditions without the necessity of maintaining an extreme pressure lubricant.

Where the treatment of the machine element is carried out with heating, the temperatures employed should not be sufficient to cause undesirable effects either on the treating medium or on the metal treated. Since many of the treating agents utilizable in accordance with the present invention are prepared at elevated temperatures or are resistant to elevated temperatures, higher temperatures may be employed in the treating bath with such agents than with those which are susceptible to undesired reaction or which give undesired effects on the metal or result in too rapid action. The length of such treatments will thus vary with different circumstances and media and metals and may vary from a few minutes to several hours. The temperatures employed need not be more than moderate temperatures, as for example, of the order of 50 to 165° C. or may be substantially higher than 165° C. Unless undesirable reactions take place, as a general rule, shorter treatment periods at elevated temperatures and higher concentrations of treating agent may be employed as compared with slower and longer treatments in the cold or at room temperature, or where the treating agent is present in minor amount in a large amount of inert carrying medium.

Various treating agents utilizable per se and in various combinations and in a variety of treating baths utilizing different types of mediums will be illustrated below to exemplify the present invention.

For example, suitable compositions may be produced by dispersing or dissolving inorganic phosphorus sulfides in liquids, dispersions, suspensions, and emulsions, both aqueous and organic and utilized in the treatment of machine elements in accordance with the present invention. Generally the liquid medium employed will be substantially inert to the particular phosphorus sulfide utilized. As exemplary of the phosphorus sulfides that may be employed there may be mentioned phosphorus pentasulfide $P_2S_5$, phosphorus sesquisulfide $P_4S_3$, phosphorus trisulfide $P_4S_6$, phosphorus heptasulfide $P_4S_7$, phosphorus disulfide $P_3S_6$, etc. As exemplary of the substantially inert liquids which may be utilized for dispersing or dissolving the inorganic phosphorus sulfide for utilization in accordance with the present invention there may be mentioned the lower aromatic liquid hydrocarbons such as benzene and toluene, and their halogenated and similar substitution products, materials like alphachlornaphthalene, water, solutions of inorganic bases like the caustic alkalies or of organic bases such as the amines and alkylolamines, inorganic acids such as sulfuric, hydrochloric, and nitric, or in general any diluent capable of suspending or dispersing phosphorus sulfide so as to bring it in intimate contact with the metal surface of the machine element and thereby enable it to form the desired phosphorus sulfide protective film.

Other desirable compositions that can be utilized in the treatment of metal machine elements include the reaction products of a phosphorus sulfide such as those set forth above with an organic body to produce a phosphorus-sulfur modified organic derivative. A wide variety of organic bodies may be utilized for modification by the phosphorus sulfide treatment including aliphatic hydrocarbons either per se or in admixtures, fatty acids particularly high molecular weight fatty acids and their esters, ketones, alcohols both aliphatic and carbocyclic, dicarboxylic acids both aliphatic and aromatic, phenols and other hydroxy aromatic compounds, such as trichlordiphenyloxide, sulfonic acids both aliphatic and carbocyclic and their derivatives, mineral oil, its fractions and distillates, olefines, olefine polymers, etc.

The phosphorus sulfide reaction products of these organic bodies are generally produced at temperatures of elevated order usually running from above 150° F. to 500° F. The reaction is conducted by heating the materials together until evolution of hydrogen sulfide ceases at which time the reaction may be considered substantially complete. Where such heat treatments are carried out as with the mineral oil fractions, etc., a chemically reacted and modified product is obtained. However, as pointed out above, the mineral oil fractions, etc. may be utilized as media in which the phosphorus sulfide can be utilized in the cold in the treatment of machine elements, or with heat treatment where some phosphorus sulfide reaction product may be formed in situ and an excess of unreacted phosphorus sulfide may also be present beyond that necessary for reaction. The amount of phosphorus sulfide employed for chemical reaction on the organic material will vary within substantial limits depending on the organic body undergoing treatment and the conditions under which the operation is carried out. Usually not more than 1 mole of phosphorus sulfide per mole of organic body need be employed and the amount of phosphorus sulfide may be substantially less, for example, not more than 50% by weight of the organic body undergoing treatment or only a fraction of a percent of phosphorus sulfide may be employed where far reaching reactions are not desired.

Where the phosphorus sulfide modified organic body is employed and is in liquid condition or is liquid at the temperature at which the treatment of the machine element is carried out, it is unnecessary to have any diluent or inert medium present with it. However, the phosphorus sulfide modified organic derivatives may be utilized in media of the character set forth above for the inorganic phosphorus sulfides. Mixtures of the inorganic phosphorus sulfides or any of them as set forth above together with the phosphorus sulfide reaction products of the organic derivatives as set forth above or mixtures of the latter may be used alone either in such admixtures without inert liquids or diluents or carrying mediums present or the mixtures may be employed together with inert liquids or mediums as set forth above in the treatment of the machine element either at room or elevated temperatures. Such mixtures containing both the inorganic phosphorus sulfides and the phosphorus sulfide modified organic bodies may be produced by utilizing an excess of phosphorus sulfide in producing the reaction product but carrying out the reaction to a point where the organic body is modified by chemical reaction with the phosphorus sulfide while still retaining an excess of phosphorus sulfide present in the mixture, and the reaction product then cooled and utilized for treating purposes as set forth herein. In all such cases, if desired, the phosphorus sulfide reaction product of the organo compound may be purified before use so that there is no excess of phosphorus sulfide in the final product, to give the modified organic compound per se which may be utilized as herein set forth. Or the product obtained by reacting the phosphorus sulfide with the organic body may be carried out under such conditions that reaction takes place with utilizing substantially all of the phosphorus sulfide which was added, and the reaction product thus obtained may have further quantities of the desired phosphorus sulfide added to it. In any of these cases the phosphorus sulfide utilized in admixture with the phosphorus sulfide modified organic derivative may be different from that employed in producing the phosphorus sulfide modified organic body.

Treating compositions containing inorganic phosphorus sulfides or phosphorus sulfide modified organic bodies as described above may be utilized in conjunction with minor amounts of organic sulfo compounds which may merely be added to the mixtures containing the phosphorus sulfides or their derivatives as set forth above to produce compositions of value. The presence of free organo sulfo compounds in such treating compositions appears to have a synergistic action and to activate the phosphorus sulfide materials to form a more tenacious chemical protective lubricating film on the metal surface. The organic sulfo compounds that may be employed include particularly the sulfonic acids and the sulfonates derived from them as well as their esters, and may be both aliphatic, aromatic, carbocyclic, alicyclic, and heterocyclic. Generally the organic sulfonic acids and their salts or esters may be considered primarily from the standpoint of those of the aromatic hydrocarbons and those of the aliphatic series. Either or both may be utilized in carrying out the present invention for purposes set forth above but the sulfonic acids of the aromatic hydrocarbon series, their salts and esters are more readily available and can be utilized to illustrate the invention. The sulfonic acids employed may be those produced from individual hydrocarbons or mixtures of hydrocarbons or may be those derived in the purification or treatment of petroleum fractions and distillates. Exemplary sulfonic acids of which the derivatives like salts and esters may also be employed include hexane sulfonic acid, amyl sulfonic acid, mono chloro amyl sulfonic acid, benzene sulfonic acid, phenol sulfonic acid, naphthalene sulfonic acid, heptane sulfonic acid, acetone disulfonic acid, dichloro amylene sulfonic acid, myristic sulfonic acid, stearic sulfonic acid, anthracene sulfonic acid, the sulfonic chlorides, disulphonic dinaphthyl methane, tristearin sulfonic acid, amylum sulfonic acid, spermaceti sulfonic acid, petroleum sulfonates such as the mahogany sulfonates and sulfonic acids, diphenyl parasulfonic acid, polyalkylated diphenyl sulfonic acid, polyalkylated naphthalene sulfonic acids, sulfonated castor oil and similar materials, sulfo dicarboxylic acids and their esters, etc., etc. The benzene sulfonic acid is exemplary of other monocyclic aryl sulfonic acids such as toluene sulfonic acid, etc.

As an example of one method of producing a satisfactory sulfonic material, commercial benzol which may contain toluene, xylene, phenol, and other compounds, may be treated as follows:

The commercial benzol is sulfonated with fuming or concentrated sulfuric acid, the mixture being subjected to elevated temperatures. Starting with a definite weight of concentrated or fuming sulfuric acid, say 100 mole weight, heated gradually, commercial benzol is added either in the liquid or vapor state to the extent of about 50 to 70 mole weight until approximately from one-half to three-fourths of sulfuric acid is reacted with the benzene to form benzene sulfonic acid and a mixture of other sulfonic acids where other materials as indicated above are present. To the sulfuric acid benzene sulfonic acid mixture, commercial naphthalene is added until about 50% of the remaining free sulfuric acid reacts with it to form naphthalene sulfonic acid.

In production factory test runs, the crude naphthalene employed in the above mixture was approximately 50% naphthalene, 20% phenanthrene, 10% carbazone, and 20% anthracene. To this was added about 4 mole weight of phosphorus pentoxide to take up the water of reaction, and with continued heating the resultant composition of sulfonic acids was substantially free from sulfuric acid.

In passing, it may be stated that the chloro benzene, chloro naphthalene, stearin, spermaceti, stearic acid, and the like were used in a manner similar to that just described with extremely satisfactory results. In any of these cases where sulfonic acids are present, any free sulfuric acid may be eliminated in a variety of ways as by neutralization, precipitation as an inorganic compound, etc. While phosphorus pentoxide has been suggested as a dehydrating agent, other dehydrating agents may be employed. However, where the phosphorus pentoxide is utilized, the phosphorus may serve additionally beyond its dehydrating function merely, either to catalyze the surface reaction or may form a phosphoro-metal compound with the surface, etc. Any neutralization which is utilized to eliminate unreacted sulfuric acid or to reduce the amount present may be carried out by utilizing inorganic or organic bases such as aniline and other amines. Other types of amines that may be employed are illustrated below in other connections and any of them may be utilized in accordance with this invention at this stage for neutralization of any free sulfuric acid present in the sulfonic acids produced.

These organic sulfo compounds whether sulfonic acids or sulfonates or esters thereof may be utilized as indicated above either with the organic phosphorus sulfide bodies or the inorganic phosphorus sulfide, or mixtures of them, and they may be so employed either per se where the sulfonic acid or the phosphorus sulfide modified organic derivative is a liquid medium which also serves to carry the other materials, or these combinations of materials may be employed together with inert liquids or mediums of the character set forth above.

The organo sulfo derivatives referred to above have been indicated for utilization with the inorganic phosphorus sulfides or the phosphorus sulfide modified organic bodies. However, the organic sulfo derivatives of the character set forth above may be utilized without the inorganic phosphorus sulfides or phosphorus sulfide modified organic derivatives, and employed in the treatment of machine elements as set forth herein to produce surface modified machine elements having characteristics particularly adapting them for withstanding extreme service conditions. Any of the indicated organo sulfo compounds including the sulfonic acids, their salts and esters may be employed in this way either individual substantially pure sulfonic acids and their derivatives, or various admixtures of such sulfonic acids with themselves and with other derivatives; and they may be so employed in liquid condition without inert liquids or diluents being present or they may be employed in inert media of the character set forth above for use in other relations and particularly in the mineral oil or petroleum oil, their fractions and distillates to produce desirable products for treating machine elements. For example, a sulfonic acid may be selected that will stay in a petroleum lubricating oil fraction and utilized as such composition or a compatibilizing agent such as an alcohol may be introduced to serve as an intermediary medium in such combinations with or without the additions of other amines like "Alkaterge-O" (a substituted oxazoline in the form of an oil-soluble, dark brown, viscous liquid), or similar materials.

To any of the above compositions or reaction products, minor amounts of organic amines may be added. Such amines includes aliphatic, carbocyclic, and heterocyclic amines and exemplary amines are as follows: diethylamine, monoamylamine, diamylamine, triamylamine, di-n-butylamine, monobutylamine, dibutylamine, undecylamine, oleylamine, myristic amine, palmityl amine, stearylamine, mono-, di- and triethanolamine, laurylolamine, palmitylolamine, stearylolamine, ethylene diamine, diamino isopropanol, cyclohexylamine, dicyclohexylamine, benzylamine, morpholine, piperidine, pyridine, quinoline, quaternary ammonium hydroxides, etc. These amines may be added at any time either during the reaction when reaction products are being produced as set forth above, or after the reaction has been completed. They have a marked tendency to inhibit corrosion, and therefore, may desirably be included with any of the materials and compositions set forth above. The organic base or mixtures of them may be selected as to exhibit in addition, the property of absorbing or removing gases such as hydrogen sulfide, sulfur dioxide, and other acidic gases that may be present in the atmosphere, or those that may form in situ. Exemplifying this feature, the triethanolamine referred to above will function in this way.

The following examples will illustrate the invention more fully, parts being by weight unless otherwise indicated.

*Example 1.*—Machine elements such as transmission gears, piston rings, pistons, cylinders and camshafts, were treated in 30 to 75% caustic soda solution containing 1–12% phosphorus pentasulfide, at a temperature between 150° and 400° F. until a coating or film had formed upon the metal surface. Treatment for a time period of from 2 minutes to a few hours, seldom more than 6 hours will usually be sufficient for this purpose. The chemically treated metal element was then removed from the treating bath, washed, dried, and carefully cleaned in order to prevent corrosion.

*Example 2.*—Machine elements of the type used in Example 1 above were treated with a reaction product of phosphorus pentasulfide and mineral oil. The reaction product was made by reacting 1–30% $P_2S_5$ and mineral oil at a temperature of 250–450° F. until evolution of hydrogen sulfide had substantially ceased. Approximately 5–50% of this product was diluted with mineral oil, the mixture heated, and the machine element immersed in the mixture for from about ½ to 8 hours at an elevated temperature not exceeding 500° F. until a thin film or coating had formed.

*Example 3.*—To the diluted phosphorus pentasulfide-mineral oil reaction product produced in Example 2 above, a minor amount of for example, 0.25–20% of diphenyl parasulfonic acid is added, and the entire mixture heated to 275–450° F. The machine element to be treated is immersed in such composition for a period of from ½ to 8 hours at an elevated temperature in the range indicated above, during which time a thin, tenacious film formed.

*Example 4.*—Oleic acid was reacted with 1–30% phosphorus pentasulfide at temperatures of from 275 to 450° F. until the reaction was completed, whereupon triethanolamine was added in an amount sufficient to neutralize the reaction product substantially. The reaction product was then diluted with a major amount of mineral oil. Machine elements were treated with this reaction product for a period of ½ to 8 hours at a temperature of 150 to 400° F. until a thin, tenacious coating had formed.

*Example 5.*—A composition as produced above under Example 4 was modified by adding to it a minor amount of a sulfonic acid, for example, 0.5–20% of paradiphenyl sulfonic acid was dissolved in such composition and the machine elements then treated in this mixture at temperatures for example, of from 150 to 450° F. for from a fraction of 1 hour to 8 hours until a thin protective coating had formed.

Any of the compositions of Examples 2 to 5 above may be used in diluted condition, as for example, after dilution with mineral oil, emulsions, aqueous solutions, or as indicated may be used per se for treating the machine elements. In preparing compositions where a phosphorus sulfide reaction product is employed, the phosphorus sulfide need not be reacted with a single organic component but may be reacted with various mixtures of any of the organic compounds stated above. Or the phosphorus sulfide may be incorporated with the remainder of the composition in the cold, the metal parts immersed in such composition, and the treatment carried out either without external heat or at an elevated temperature until a desired reaction product is formed and acts on the metal of the machine element. Suitable compositions may be prepared by reacting simultaneously a mixture of fatty acid, such as oleic acid, and mahogany sulfonate with a phosphorus sulfide such as phosphorus pentasulfide until the reaction is substantially complete, and then if desired, the resulting composition neutralized with an appropriate amount of an amine such as triethanolamine. Such reaction products may be diluted with major amounts of mineral oil or other mediums and used for the treatment of machine elements or in situ while in its functional use in accordance with this invention. Other examples illustrating these various features are further set forth below.

*Example 6.*—220 parts of light fraction of mahogany soap were heated at a temperature of 100 to 350° C. with 70 parts of phosphorus pentasulfide until the evolution of hydrogen sulfide substantially ceased, then 44 parts of aluminum stearate were added and appeared to react with possible residual unreacted phosphorus sulfide complex; to this product 209 parts of 50 SAE oil were added. The whole mixture was neutralized with triethanol amine.

Such compositions may be utilized per se in the treatment of machine elements in accordance with the present invention or may be further modified. For example, sulfonic acids, particularly oil-miscible sulfonic acids may be incorporated with the composition. Diphenyl sulfonic acid may thus be employed. The resulting material may then be utilized either with or without phosphorus pentasulfide or other sulfides as illustrated above, and the resulting composition used in service oils such as crank case oil, transmission oil, or rear axle oil. These features illustrate the inclusion of additives to oils or lubricants for high or extreme pressure service or for the manufacture of final oils to be employed for those or other purposes. In carrying out the addition of the sulfonic acids the following procedure may be utilized. Diphenyl sulfonic acid or anthracene sulfonic acid and the like may first be plasticized, dissolved or suspended in a suitable medium such as an alcohol, for example, ispropyl alcohol, butyl alcohol, etc., and the resulting material added to the composition of Example 6 above. More phosphorus pentasulfide may then be added either by itself or previously dissolved in appropriate organic solvents such as an amine, for example, butyl or amyl amine. The amine may serve a triple purpose in such connection: first, as a solvent for the phosphorus sulfide and lubricating medium; second, it may neutralize any acids or their gases formed when the phosphorus sulfide reacts in situ and may tend to absorb any hydrogen sulfide, sulfur dioxide, etc., that may be formed; and third, may act by itself or enhance the rustproofing properties.

The proportions of sulfonic acids added to such compositions will be illustrated below.

*Example 7.*—50 parts of the composition of Example 6. 2 parts of diphenylsulfonic acid.

*Example 8.*—50 parts of the composition of Example 6. 5 parts toluene sulfonic acid.

*Example 9.*—50 parts of the composition of Example 6. 5 parts of diphenyl sulfonic acid dissolved in ethyl alcohol.

*Example 10.*—The treating agent utilized in this example is the sulfonated commercial benzol containing toluene, etc., produced as set forth for example, above in "producing a satisfactory sulfonic material." It may be utilized as such in the treatment of machine elements or with other media.

*Example 10A.*—Further such sulfonic acids may be utilized in an aqueous medium, in an alcohol medium, in a benzene medium, or various combinations thereof. As exemplary of such compositions there may be employed crude naphthalene sulfonic acid, for example, 6%, denatured alcohol 50%, water 34%, benzene 10%, the percentages being by weight. In such types of compositions, the water may serve particularly as a medium or solvent for the sulfonic acid while the alcohol and benzene may serve in addition to dissolve any grease present on the machine element so that the sulfonic acid may more readily penetrate to the surface of the metal being treated. While alcohol and benzene may also be solvents for the particular sulfonic acid or sulfonate employed, it is not essential that all the solvents present be solvents for the sulfonic acids in such compositions.

*Example 11.*—50 parts of the composition of Example 10. 20 parts of water.

*Example 12.*—25 parts of phosphorus pentasulfide dissolved in 20 parts of alcohol added to 250 parts of Example 11.

Such composition may be utilized in the treatment of machine elements at elevated temperatures as illustrated above in preceding examples. However, this example also illustrates compositions that may be utilized for treating machine elements in the cold. For example, gears may be immersed in such composition for 24 hours and then removed and utilized in accordance with the present invention. Or such composition may be used in service in situ, or when added to a suitable medium in rear axle, hypoid, etc.

*Example 13.*—458 parts of phosphorus pentasulfide dissolved in 723 parts of water and in 50 parts isopropyl alcohol and then added to 2790 parts of the composition of Example 6.

*Example 14.*—100 parts of phosphorus pentasulfide dissolved in 500 parts of triethanolamine.

*Example 15.*—500 parts of phosphorus pentasulfide, 1000 parts of sodium bicarbonate, 1100 parts of water, 100 parts of triethanolamine.

*Example 16.*—400 parts of phosphorus pentasulfide, 1000 parts of sodium bicarbonate, 900 parts of water, 100 parts of triethanolamine.

*Example 17.*—100 parts of phosphorus pentasulfide, 500 parts of sodium hydroxide, 250 parts of water.

*Example 18.*—150 parts of phosphorus pentasulfide, 500 parts of sodium bicarbonate, 350 parts of water.

In any of the above-entitled compositions, the materials may be mixed in any desired way unless some special method of incorporation of the ingredients has been indicated.

In order to determine the extent of improvement in load-carrying capacities of machine elements pretreated in accordance with this invention, tests were conducted on the S. A. E. testing machine as described in the S. A. E. Journal, volume 33, page 402 (1933). The lubricant used in the S. A. E. testing machine was a commercial non-corrosive extreme pressure lubricant containing sulfur. The results obtained with such commercially available material and products produced in accordance with the present invention are illustrated below:

| Type of Lubricant Used | Treatment | S. A. E. Tester Total Load at Failure |
|---|---|---|
| S containing commercial lubricant. | None | 800 |
| Do | Composition of Ex. 1 | 7,000 |
| Do | Composition of Ex. 2 | 5,500 |
| Do | Composition of Ex. 3 | 8,800 |
| Do | Composition of Ex. 4 | 7,000 |
| Do | Composition of Ex. 5 | 9,000 |

As shown by these results, machine elements pretreated according to this invention and lubricated with a good non-corrosive extreme pressure lubricant are capable of withstanding loads far in excess of those machine elements that are untreated in accordance with the present invention.

Transmission gears pretreated in accordance with the present invention, when examined after an actual test run in an automobile engine, showed no signs of any scoring, scuffing, or seizure, while similar gears run under the same conditions but not given any pretreatment in accordance with the present invention, showed signs of wear, scratching, and scoring.

Other exemplary results obtained by utilizing compositions of the present invention for pre-treatment of fabricated machine elements will be given below. It is not intended to suggest that each stated composition is equally as good as any other stated composition under any and all conditions. However, good results will be obtained with any of these compositions under general conditions and particular conditions may be chosen to give improved results. In some cases the results obtained were determined on an Almen testing machine designed with 30 pounds as a maximum full load. Even with full load some tested articles showed no wear at all. Some articles like gears and pinions may desirably be tested in accordance with the number of hours that they stand up under an accelerated test under actual operating conditions and compared with the conventional lubricating mediums of even extreme pressure lubricant type, normally employed in service in that connection.

The composition of Example 6 utilized in the pretreatment of gears, gave excellent results. This reference is to the first composition referred to at the beginning of Example 6 through addition of the triethanolamine. In the actual tests run the gears did not scuff, after 23½ hours operation, while operations utilizing conventional lubricants available on the market could not obtain comparative results in a test operation lasting more than 2 hours.

The composition of Example 7 gives fair results, for example, at approximately half-load, while the composition of Example 8 gives excellent results even under full maximum load. The compositions of Examples 9, 10, 11, 12, 13, 14, 17 and 18 gave excellent results, most of them even under full load, while the compositions of Examples 15, and 16, were at least good in the results obtained under approximately 70 to 75% load. To illustrate further some of the results obtainer, Example 12 was tested with pinions which were treated for 34 minutes with the composition of Example 12 at a temperature of approximately 160° C. These pinions when hooked onto a 90 horsepower pump stood up without scuffing for 93¼ hours against a ¼ hour test with gears which had not been given the treatment with the composition of Example 12.

The composition of Example 13 used in the treatment of gears resulting in those machine elements which stood up 600 hours as compared with a 6 hour test for gears which had not been treated. The treatment with the composition of Example 13 was carried out by cooking the gears for 14 hours and 20 minutes in the stated composition. Longer or shorter periods of treatment may be utilized and that given is merely exemplary. The composition of Example 9 gave most excellent results in connection with gears treated therewith. Examples 15 and 16 while satisfactory do not give as good results as those obtained with the compositions of Examples 6, 8, 9, 11, 12, 13 and 17.

As illustrative of the treatment of elements of the character of hinges and hinge pins, hinge pins treated with a composition of Example 12 stood up (when "1" drop of oil was introduced on the pin in order to plasticize the surface) about 200,000 cycles against about 25,000 cycles when ordinary service lubricant was used without the pre-treatment in accordance with the present invention.

Further examples illustrating the effects obtained with the compositions and treatments of the present invention are given below.

*Example 19.*—A mixture of 72 parts of sulfonic acid complex (prepared as described above in "producing a satisfactory sulfonic material") with 28 parts of water, was used to treat various finished machined parts, such as gears, pinions, piston rings, shock absorber heads, pinions and pressure cylinders. The bath was maintained at temperatures of from 90 to 135° C. for treating times of from 10 to 45 minutes. To determine the efficacy and life of the bath, wedges and pins were treated and tested in the Almen machine. Exemplary results were as follows. A pin from the first bath failed at 14 pounds; one from the fourth bath did not fail at 30 pounds; another from the sixth bath stood up the maximum load of 30 pounds. These results may be compared with failure at 8 pounds in the Almen machine for treatment with plain oil.

A word should be said as to the effect of water dilution producing etching. Etching of some metal parts may be caused by dilutions with water of 33⅓% or more, and should be avoided as a general rule. Such effect necessarily depends on the particular composition being used and the nature of the metal part being treated, time, temperature, and other factors.

*Example 20.*—A mixture of 62.5 parts of sulfonic acid complex, as given in Example 19, with 25 parts of water and 6.25 parts of phosphorus pentasulfide dissolved in 6.25 parts of alcohol was used. The same parts were treated as in Example 19 for times of 15 to 45 minutes at a temperature 30° C. to 130° C. The pins in the Almen machine from first bath failed at 16 pounds, from the fourth bath stood up a maximum of 30 pounds, but the bath weakened sooner than that of Example 19.

*Example 21.*—Sodium hydroxide 58.6 parts was dissolved in 29.4 parts of water and then were added 12 parts of phosphorus pentasulfide. This bath was tested as in Examples 19 and 20. Time in each bath from 3 to 30 minutes, temperature 90 to 180° C. The parts from the first bath stood up 12 pounds, fifth bath 16 pounds, eighth bath 16 pounds.

Wire drawing dies, mandrels for drawing tubes, dies for deep-drawing and stamping, dies for piercing were treated with compounds of Examples 19 and 20 and functional operations carried out without aid of any additional lubricating medium and gave superior results than with the conventional lubricants.

Having thus set forth my invention, I claim:

1. The method of improving the load capacity of fabricated machine elements in condition without further metal working for use under extreme pressure conditions normally causing wearing, scoring and scuffing, which method consists in chemically treating said machine elements in a treating medium consisting of a phosphorus sulfide as the essential treating agent in a caustic soda solution at a temperature from 150 to 400° F. for a period of from two minutes to six hours to modify the wearing pressure surfaces of the element in situ making it capable of withstanding extreme pressures and loads.

2. The method as set forth in claim 1 in which the treating medium consists of 30 to 75% caustic soda solution containing 1 to 12% of phosphorus pentasulfide.

MICHAEL W. FREEMAN.

(References on following page)

REFERENCES CITED

The following references are of record in the file of this patent:

UNITED STATES PATENTS

| Number | Name | Date |
|---|---|---|
| 1,719,930 | Gray | July 9, 1929 |
| 1,992,045 | Schweitzer | Feb. 19, 1935 |
| 2,063,629 | Salzberg et al. | Dec. 8, 1936 |
| 2,133,828 | Moran | Oct. 18, 1938 |
| 2,242,260 | Prutton | May 20, 1941 |
| 2,266,379 | Floyd | Dec. 16, 1941 |
| 2,274,022 | Williams | Feb. 24, 1942 |
| 2,285,853 | Downing et al. | June 9, 1942 |
| 2,311,653 | Farrington et al. | Feb. 23, 1943 |
| 2,328,727 | Langer | Sept. 7, 1943 |
| 2,349,785 | Faust | May 23, 1944 |
| 2,393,335 | Musselman | Jan. 22, 1946 |
| 2,400,573 | Prutton | May 21, 1946 |

FOREIGN PATENTS

| Number | Country | Date |
|---|---|---|
| 447,176 | Great Britain | May 13, 1936 |

OTHER REFERENCES

Fritz Ephraim, "Inorganic Chemistry, 4th edition—Revised (1943), page 739, publ. by Nordeman Publishing Co., Inc., New York.

Hodgman, "Handbook of Chemistry and Physics," 28th edition (1944), pages 428–429.

G. C. Pritzker, National Petroleum News, vol. 37, No. 49 (Dec. 5, 1945), pages R–1001, R–1002, R–1004, R–1006, R–1008 to R–1010.